US008561885B1

(12) United States Patent
Folk et al.

(10) Patent No.: US 8,561,885 B1
(45) Date of Patent: Oct. 22, 2013

(54) PROCESSING OF NON-CURRENCY AT CASH HANDLING DEVICES

(75) Inventors: Amy Baker Folk, Charlotte, NC (US); Daniel Christopher Bohen, Charlotte, NC (US); William Thomas Sanders, Denver, NC (US); Shane Anthony Johnson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 914 days.

(21) Appl. No.: 12/277,909

(22) Filed: Nov. 25, 2008

(51) Int. Cl.
*G07F 19/00* (2006.01)

(52) U.S. Cl.
USPC .......................................................... 235/379

(58) Field of Classification Search
USPC ................................................. 235/379, 383
See application file for complete search history.

(56) References Cited

U.S. PATENT DOCUMENTS

| | | | | |
|---|---|---|---|---|
| 5,239,165 | A | * | 8/1993 | Novak ............................ 235/375 |
| RE34,915 | E | * | 4/1995 | Nichtberger et al. ...... 705/14.23 |
| 6,189,785 | B1 | * | 2/2001 | Lowery ........................... 235/379 |
| 6,848,612 | B2 | | 2/2005 | Uematsu et al. |
| 6,983,836 | B2 | | 1/2006 | Adams et al. |
| 7,090,122 | B1 | * | 8/2006 | Warren et al. ................. 235/379 |
| 2001/0020638 | A1 | | 9/2001 | Uematsu et al. |
| 2001/0054643 | A1 | | 12/2001 | Siemens |
| 2003/0083969 | A1 | | 5/2003 | Uchiyama et al. |
| 2005/0080731 | A1 | | 4/2005 | Snyaneshwar |
| 2005/0108164 | A1 | | 5/2005 | Salafia et al. |
| 2006/0022032 | A1 | | 2/2006 | Fillinger et al. |
| 2007/0045395 | A1 | | 3/2007 | Corona et al. |
| 2007/0063016 | A1 | | 3/2007 | Myatt et al. |

FOREIGN PATENT DOCUMENTS

| | | |
|---|---|---|
| EP | 1486923 | 12/2004 |
| WO | 2005038623 | 4/2005 |

OTHER PUBLICATIONS

International Search Report and Written Opinion for International Application No. PCT/US2007/088650 mailed Sep. 16, 2008, 10 pages.

* cited by examiner

*Primary Examiner* — Daniel Hess
(74) *Attorney, Agent, or Firm* — Banner & Witcoff, Ltd.; Michael A. Springs (57) ABSTRACT

Non-currency items such as lottery tickets, coupons and the like may be recognized and reconciled by a retail store and a financial institution without having to physically transmit the non-currency item to a sponsor of the non-currency item or the financial institution. Instead, a retail store or other organization may electronically transmit information regarding the non-currency item to the sponsor for confirmation of payment and to the financial institution for recognition. In some configurations, the financial institution may be configured to request confirmation of payment from the sponsor (i.e., instead of the retail store). Reconciliation of a cash handling device or a portion thereof (e.g., a cash register drawer) my take into account both non-currency items and currency items so that non-currency items do not have to be separately and/or manually reconciled.

12 Claims, 10 Drawing Sheets

PROCESSING OF NON-CURRENCY AT CASH HANDLING DEVICES

BACKGROUND

In some current systems, non-currency such as lottery tickets, coupons and other cash equivalents are not immediately processed or reconciled since the non-currency must first be sent to a sponsoring organization to receive the proper credit. This may reduce the amount of cash flow that a retail store has since the retail store does not receive credit or recognition for the non-currency until it is fully processed including physically sending the non-currency to retailers or sponsors of the non-currency.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects non-currency items may be processed without physically sending the non-currency item to retailer/sponsor or a financial institution from the retail organization. Non-currency item information may be sent electronically from one entity to another for recognition and repayment purposes. Funds may be sent physically or via an electronic funds transfer to a retail store or company's account.

According to another aspect, non-currency items may be reconciled as part of a cash handling device's balance. The non-currency items may be recognized in various ways including barcode scanning, optical character recognition, RFID tagging and the like. According, non-currency items may be counted to determine a physical count of funds for comparison to a logical count of funds (e.g., an expected balance). Providing non-currency reconciliation may help reduce the risk of loss or irregularities due to processing of non-currency items.

In another aspect, a financial institution may provide immediate recognition for the non-currency item upon receiving the information of the non-currency item. The recognition may be provided without receiving a physical copy or the original of the non-currency item.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), depository machines, currency recyclers and the like. Currency recyclers generally refer to cash handling devices that are configured to dispense the same currency that was earlier deposited. For example, if a user deposits a five-dollar bill into a cash recycler machine, the same five-dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
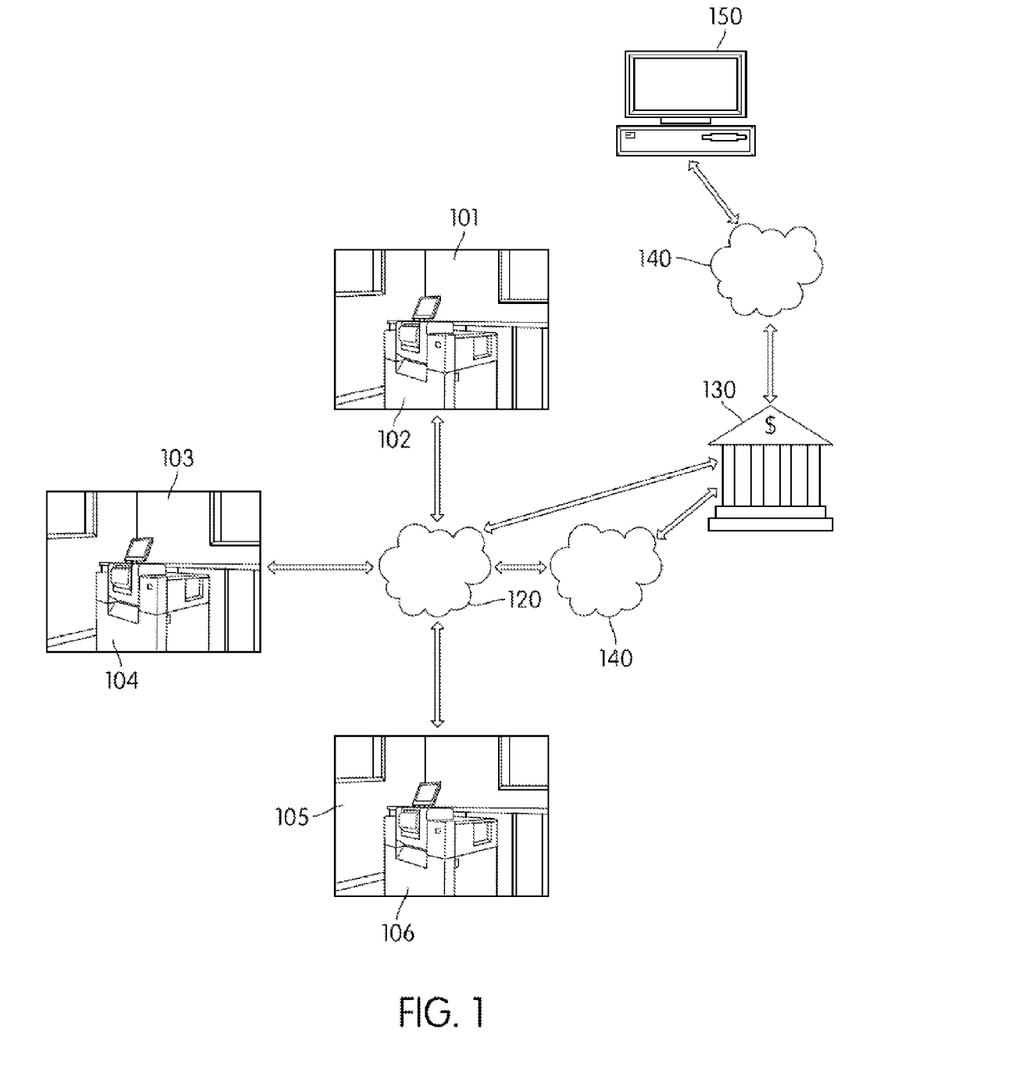
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
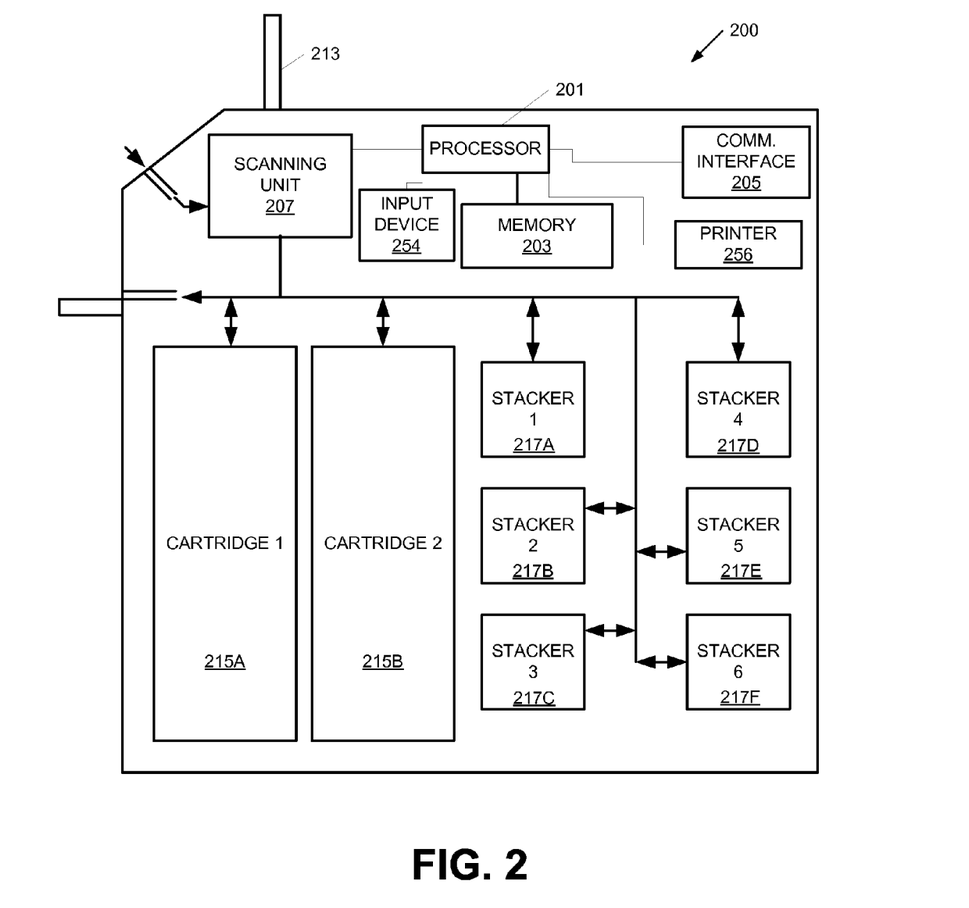
FIG. 2 illustrates a simplified diagram of a cash recycler that may be used in accordance with the operating environment of FIG. 1.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and recycling units such as stackers 217 or rolled stored modules (RSMs). Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or more printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport. In some configurations, RSMs (not shown) may be used instead of or in addition to stackers 217.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
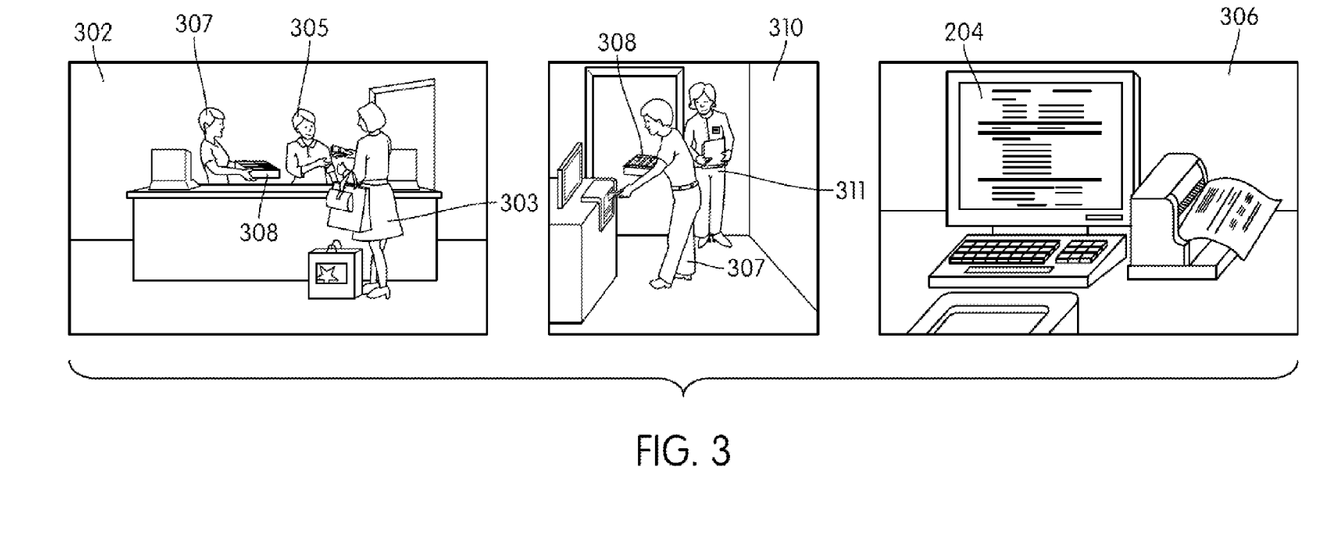
FIG. 3 illustrates various features of cash recyclers used in various aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
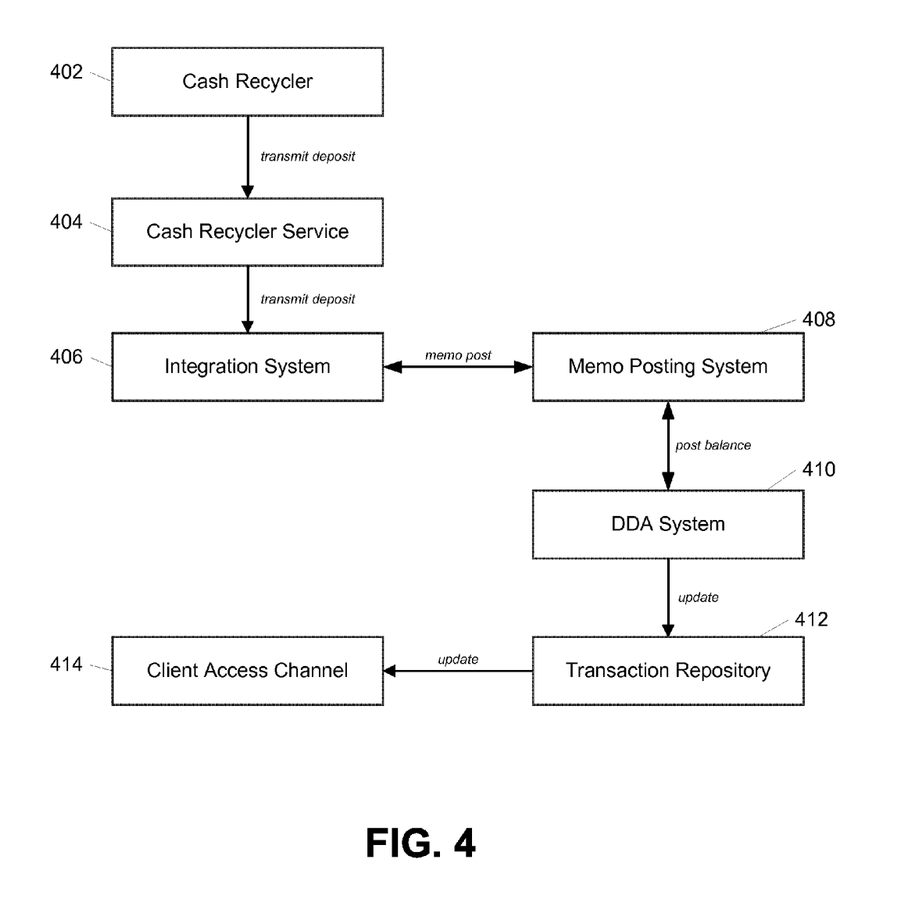
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers many advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, and U.S. application Ser. No. 12/241,385, entitled "Immediate Recognition of Financial Transactions," and filed on Sep. 30, 2008, the content of each being incorporated herein by reference in its entirety.

Typically, non-currency items such as coupons, lottery tickets and other cash equivalents need to be physically provided to a sponsor (e.g., a retailer issuing a coupon for their products) prior to a store receiving reimbursement or funds equal to the value of the non-currency item. This may lead to significant delays in receiving recognition of the value of the non-currency item. Without recognition of the value, the retail store or other organization might not receive interest on that value. Additionally, having to physically transfer non-currency items to receive reimbursement may increase costs for a retail organization.

Figure 5:
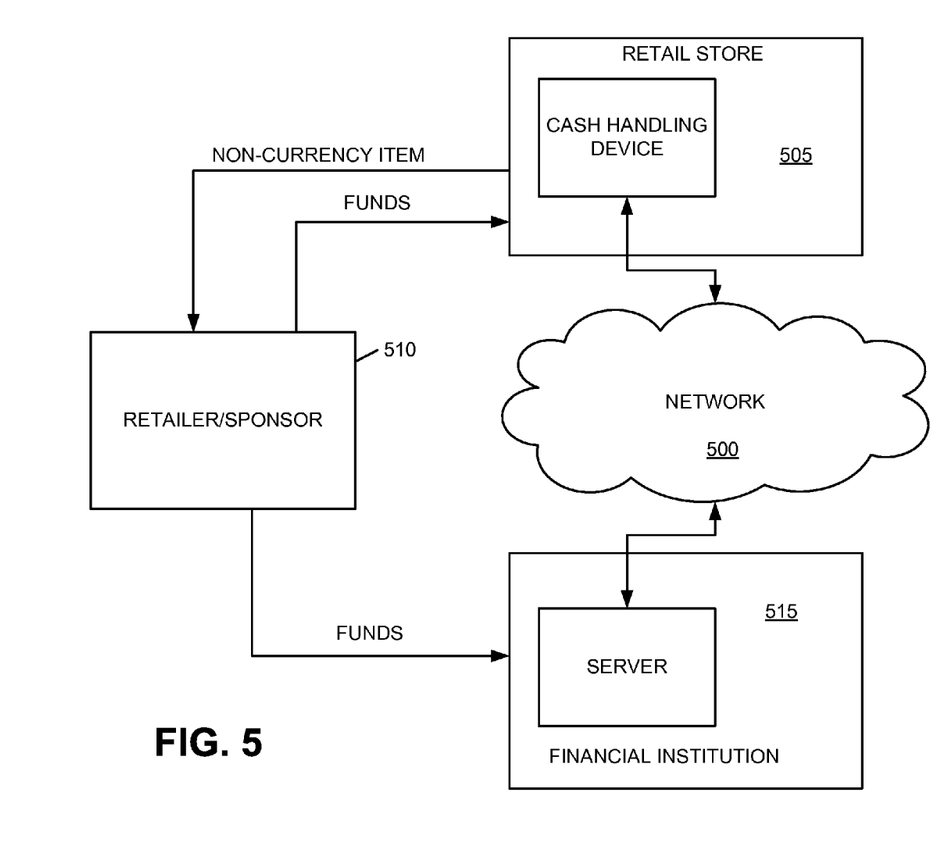
FIG. 5 illustrates an example flow diagram for transmitting data and items between a financial institution, a retail location and a sponsor of a non-currency item.

FIG. 5 illustrates an information and document flow between entities such as a retail store 505, retailer 510 and financial institution 515. When a non-currency item such as a coupon issued by retailer/sponsor 510 is presented in retail store 505, for example, the non-currency item is scanned into the retail store's system which may recognize the value and source of the non-currency item. The customer may be given credit for the non-currency item at that time. However, the retail store 505 may need to physically send the non-currency item to the retailer 510 to receive the funds corresponding to the credit given to the customer. The funds may be sent to retail store 505 or to a financial institution, e.g., financial institution 515 holding an account of retail store 505. The processing of the non-currency item may take days, weeks or even months. While retail store 505 and financial institution 515 may both be connected to and communicate through network 500, retailer/sponsor 510 might not.

Figure 6:
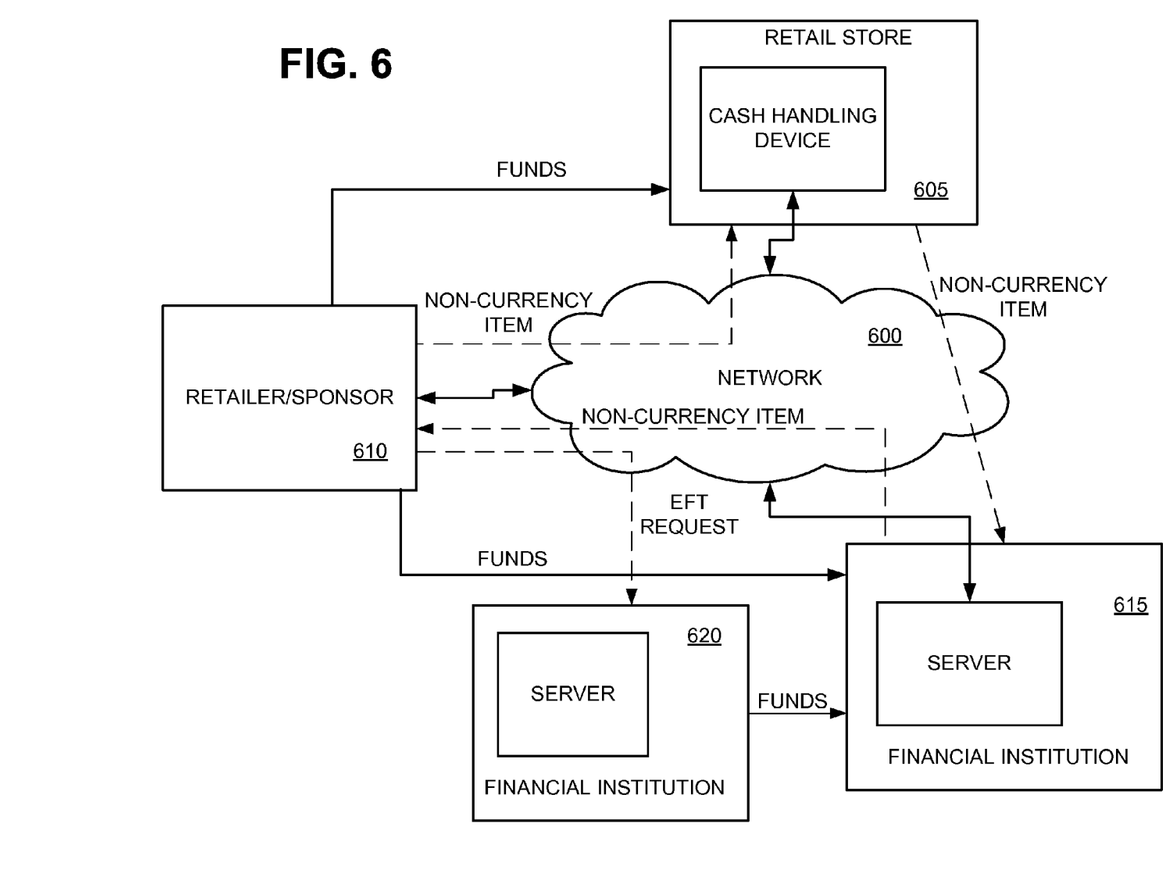
FIG. 6 illustrates an example flow diagram for processing a non-currency item according to one or more aspects described herein.

FIG. 6 illustrates an information and document flow according to aspects of the present disclosure. In contrast to the flow of data and physical non-currency items illustrated in FIG. 5, non-currency items may be recognized and reconciled while remaining at retail store 605. In particular, once a customer submits a coupon or lottery ticket for credit or payment, the point of sale system or a back office device may transmit identification information associated with the coupon or lottery ticket (or other cash equivalent) to the retailer 610 for reimbursement. The identification information and reimbursement request may be sent directly from retail store 605 to retailer 610 or may be sent via financial institution 615. The retailer 610 may then respond to the request by electronically or physically transferring funds to retail store 605. In one example, retailer 610 may send an electronic funds transfer request to financial institution 620 to electronically reimburse the retail store 605. Alternatively, a physical check or cash may be sent from retailer 610 or a bank of retailer 610 to retail store 605 or financial institution 615 holding an account of retail store 605. In the case of lottery tickets, the reimbursement or payment request may be sent to a government agency (e.g., the treasury department) sponsoring the lottery. Payment or reimbursement funds may be provided to retail store 605 or to financial institution 615. If sent to financial institution 615, financial institution 615 may automatically deposit the funds into an account of the retail store 605.

According to one or more arrangements, once a fund request has been sent to a retailer or other sponsor of a non-currency item and a confirmation has been received, a cash handling device at a retail store, e.g., retail store 605 of FIG. 6, may request and receive recognition by the financial institution of the amount of funds to be paid or reimbursed. In some instances, recognition by the financial institution may depend on whether a sponsor of the non-currency item is a trusted entity.

Figure 7:
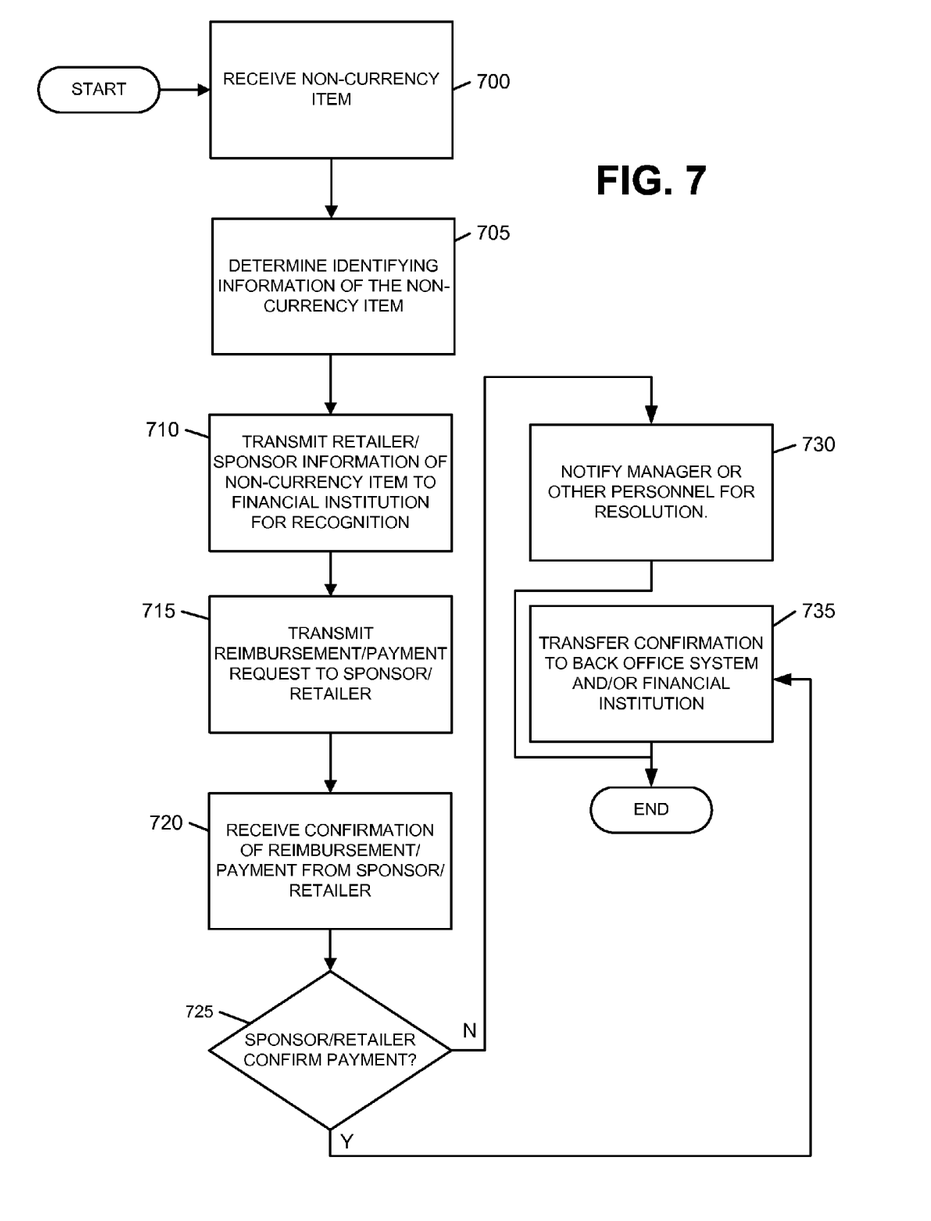
FIG. 7 illustrates a flowchart of an example method for processing a non-currency item according to one or more aspects described herein.

FIG. 7 illustrates an example method through which a cash handling device at a retail store may process a non-currency item and receive recognition of an amount associated with the non-currency item. In step 700, a cash handling device may receive a non-currency item. The cash handling device may include a cash recycler, a point of sale system, an automated teller machine (ATM) and the like. The cash handling device may be configured to accept non-currency items. In one example, the cash handling device may be configured to scan or otherwise determine identification information through a barcode, magnetic strip, RFID chip or the like from a non-currency item. In some instances, a cash handling device may require that the non-currency item be of a certain size and have identification information located at a specific area or location on the non-currency item (e.g., a location of a barcode on a coupon or lottery ticket). In step 705, the cash handling device may determine identifying information of the non-currency item. Identifying information may include a sponsor of the non-currency item, a value of the non-currency item, an expiration date, a stock keeping unit (SKU) or other product identifier and the like. In step 710, the cash handling device may transmit the sponsor/retailer information as well as the value or amount of the non-currency item to a financial institution for recognition. In one or more arrangements, the request for recognition may initially be relayed to the financial institution by a back office device. In step 715, the cash handling device may further transmit a reimbursement or fulfillment request to the sponsor of the non-currency item. The request may be sent electronically, e.g., through e-mail, using the determined sponsor information and may include information such as a purchase date and time, retail store identification, product purchased, product information (e.g., a serial number), customer identification information and the like. The request may also be sent without physically providing the non-currency item to the sponsor prior to receiving reimbursement.

In step 720, the cash handling device may receive a confirmation of receipt of the request for reimbursement from the sponsor. The confirmation may specify whether the reimbursement request was approved. Alternatively or additionally, the confirmation may include a request for additional information such as a verification code, a confirmation phone number and the like. Once received, the cash handling device may confirm that reimbursement will be received from the sponsor/retailer in step 725. If not, the cash handling device may alert a manager or other store employee to take further action in step 730. If confirmed, the cash handling device may transmit the confirmation information to a back office system and/or the financial institution in step 735. In one or more configurations, recognition of a non-currency item might not be provided until a sponsor confirmation has been received by the financial institution. Such a restriction may be placed on non-currency items to prevent recognition of non-currency items that are not reimbursed or paid.

Figure 8:
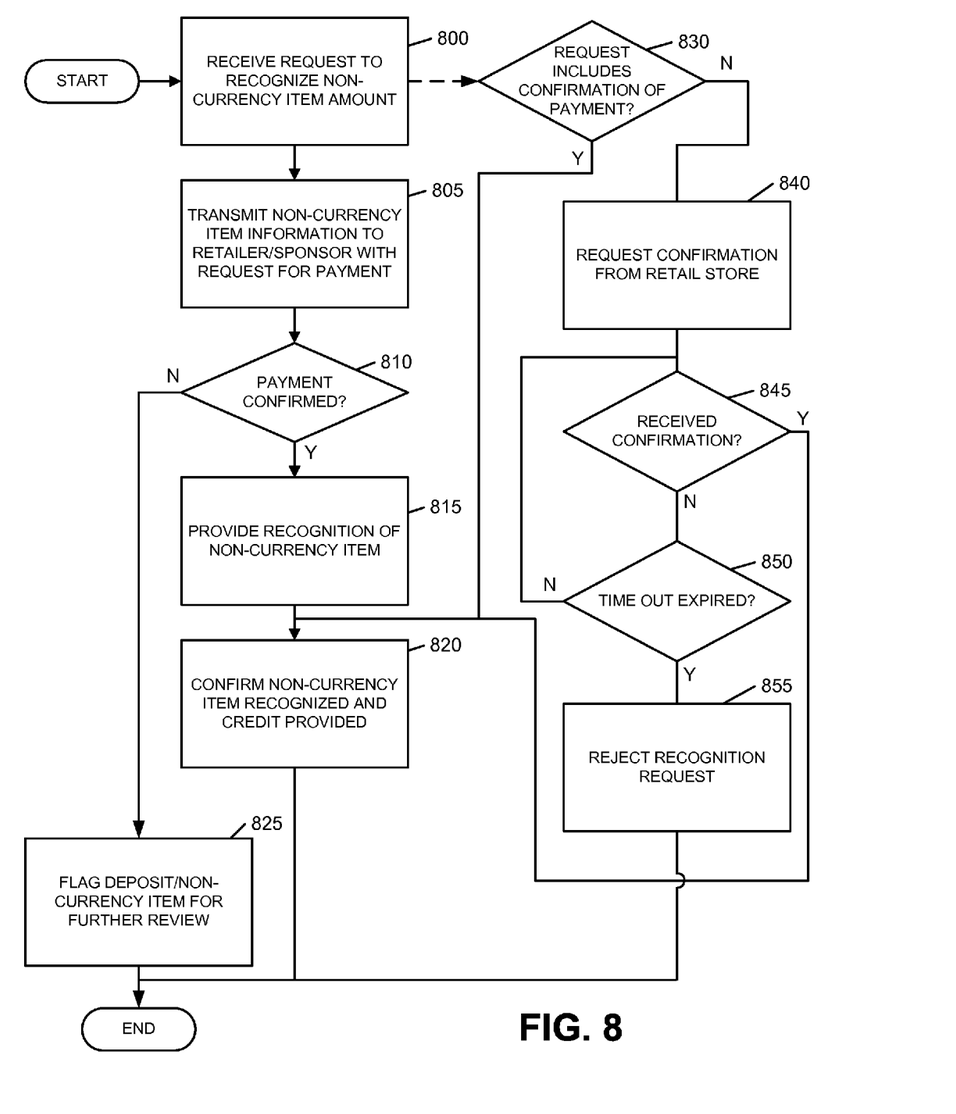
FIG. 8 illustrates a flowchart of another example method for processing a non-currency item according to one or more aspects described herein.

FIG. 8 illustrates an example method through which a financial institution may receive and process non-currency items. In step 800, the financial institution may receive a request to recognize an amount of funds corresponding to a non-currency item from a retail store. The request may include identification information of the non-currency item sponsor, an amount to be recognized, a product purchased and the like. In step 805, the financial institution may transmit the non-currency item information along with a payment request to the retailer/sponsor. In step 810, the financial institution may determine whether the retailer/sponsor confirmed payment of the non-currency item. If so, the financial institution may provide recognition of the funds corresponding to the non-currency item to the retail store in step 815. A confirmation that a non-provisional credit has been entered into the retail store's account may be transmitted to the retail store in step 820. If, however, the sponsor has not confirmed payment after a specified amount of time or has rejected the payment request, the financial institution may flag the deposit for further review in step 825. A notification that the payment request for the non-currency item was rejected may also be sent to the retail store.

Alternatively, after the financial institution received a request to recognize an amount of funds associated with a non-currency item in step 800, the financial institution may determine whether the request includes a confirmation of payment from the sponsor in step 830. If so, the financial institution may provide a non-provisional credit to the retail store's account in step 815. If, however, a confirmation has not been received, the financial institution may request a confirmation of payment from the retail store prior to recognizing the deposit of the non-currency item in step 840. In step 845, the financial institution may determine whether a confirmation that the sponsor will make payment on the non-currency item has been received. If not, the financial institution may determine whether a time-out period has expired in step 850. The time-out period may last for minutes, hours, days, weeks or months and may depend on the expected response time of a non-currency item sponsor. If the time-out period has expired, the financial institution may reject the recognition request in step 855. If, however, the financial institution has received the confirmation, the financial institution may recognize the deposit of the non-currency item, providing a non-provisional credit of the non-currency item to the retail store's account in step 815.

Figure 9:
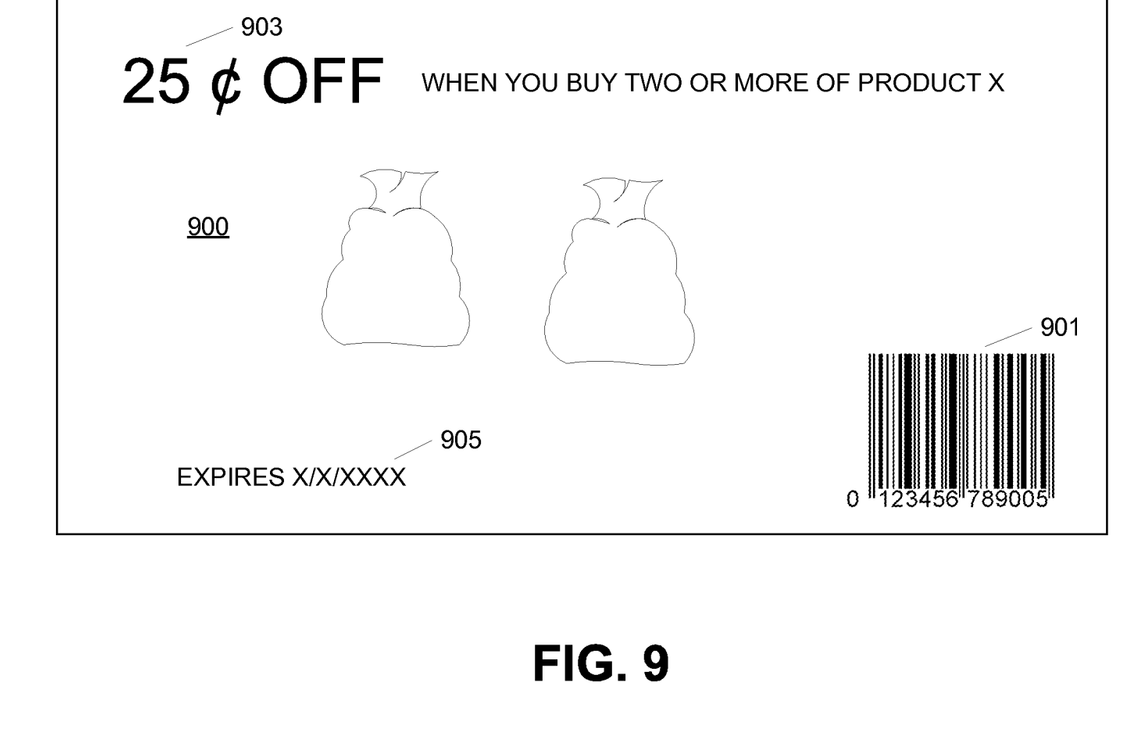
FIG. 9 illustrates an example coupon for which a reimbursement request may be sent electronically according to one or more aspects described herein.

FIG. 9 illustrates a non-currency item including fulfillment information. In particular, coupon 900 includes a barcode 901 that may be scanned to identify a sponsor, product, amount or expiration date associated with coupon 900. Additionally or alternatively, such information may be separately included in coupon 900. For example, coupon amount 903 may be printed on the face of coupon 900 along with an expiration date 905. Coupon information may be pre-stored in a retail organization's system in association with a particular barcode (e.g., barcode 901). In some instances, the retail organization may obtain barcode data from a networked database (e.g., a remote sponsor's database).

According to one or more aspects, non-currency items may be reconciled as part of a point of sale or other cash handling device balance. In many current systems, non-currency items cannot be automatically reconciled since cash handling devices are not capable of counting or otherwise recognizing such items. In addition to non-currency items that may be accepted by a business or organization (e.g., coupons, lottery tickets), non-currency items may further include items that are sold to customers including store branded currency such as gift cards or gift certificates that might only be usable at the store(s) or business(es) for which they are issued, tickets, stamps and the like. Cash handling devices and point of sale systems may be configured to recognize the various non-currency items (as described herein) via magnetic strips, barcodes, RFID chips and the like so that counting of non-currency items may be carried out automatically and seamlessly. Thus, since non-currency items may be automatically counted and recognized, the same or similar reconciliation methods may be used for non-currency items as are used for currency. By reconciling non-currency items, potential risk of loss resulting from irregularities in non-currency processing may be reduced by catching imbalances earlier and more frequently. Further, automated reconciliation of non-currency item eliminates the need to separately and/or manually reconcile non-currency items (as compared to currency).

Figure 10:
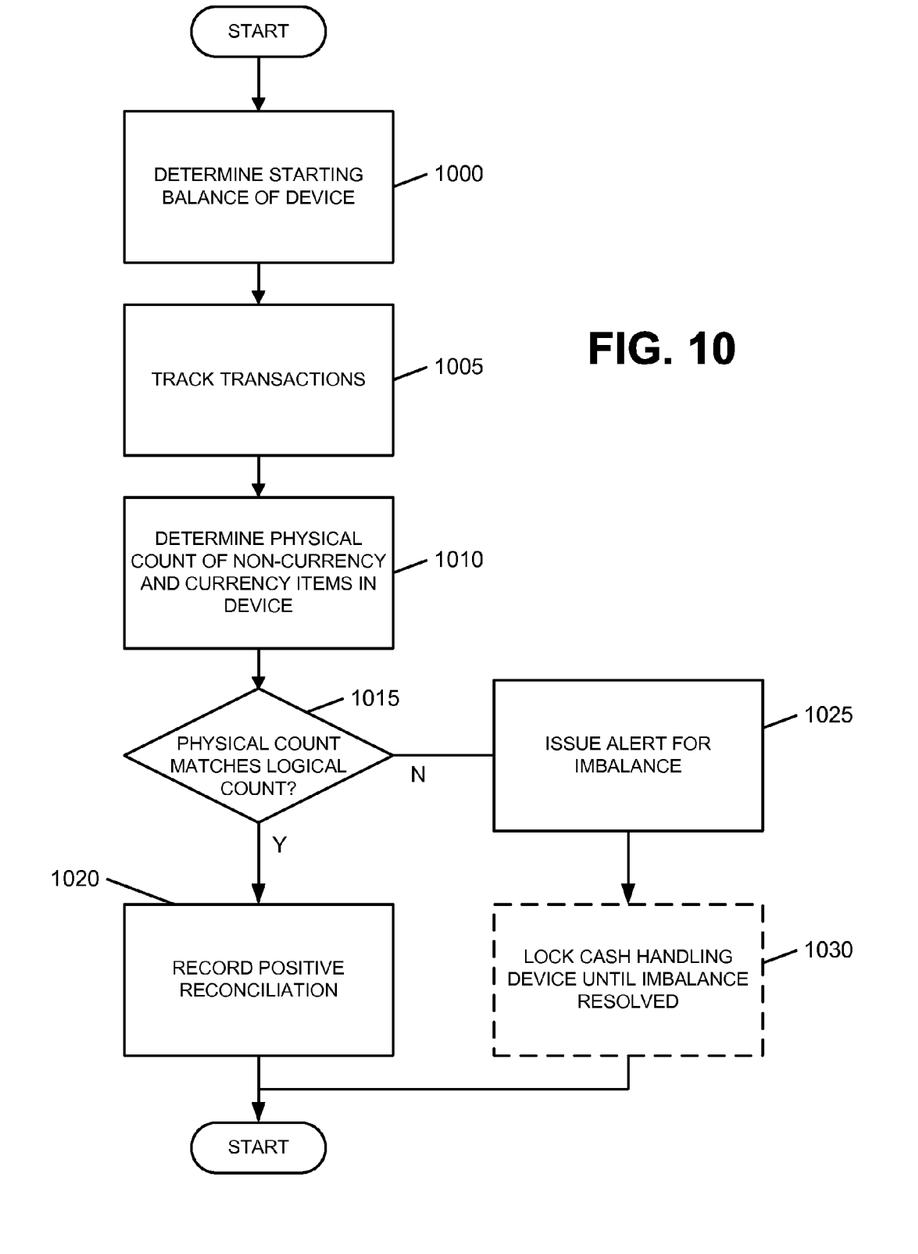
FIG. 10 illustrates a flowchart of an example method of reconciling non-currency items according to one or more aspects described herein.

FIG. 10 illustrates a method in which currency and non-currency items may be reconciled as part of a point of sale or other cash handling device balance. In step 1000, a cash handling device may determine a starting balance of the device. The starting balance may be determined based on manual input, information received from a cash distribution device (e.g., a cash handling device may tell a point of sale system how much was given for its till) or through a physical count. In step 1005, the cash handling device my track transactions as they occur throughout the day and update a logical count of funds in the device. The logical count may include the recognition non-currency items both being sold (e.g., stamps, gift cards) or received (coupons, gift certificates, lottery tickets). As discussed, recognition may be performed through scanning a barcode, RFID tag, magnetic strip, entering a serial number and the like. In one or more arrangements, a logical count may be tracked based on subtracting or adding amounts to the initially determined balance. In step 1010, the cash handling device may reconcile its balance by determining a physical count of funds in the device. Reconciliation may be performed based on a schedule or on-demand or in response to some specified trigger (e.g., number of transactions). Reconciliation may include counting the currency items using scales, counters or the like and the non-currency items as well. Non-currency items may be counted in similar fashion to the manner in which they are recognized when deposited (e.g., barcodes, optical recognition). Alternatively or additionally, non-currency items may be counted using devices such as scales. In step 1015, the cash handling device may determine whether the physical count matches the logical count. If so, the cash handling device may determine that it is in balance and indicate such in a log in step 1020. If, however, the cash handling device is not in balance (e.g., if there is a shortage), the device may issue an alert or otherwise generate a notification of the imbalance in step 1025. Optionally, the cash handling device may be locked down until the imbalance can be cleared or otherwise accounted for in step 1030.

In one or more configurations, non-currency items may be physically stored separately from currency items. The separation between currency and non-currency items may help in determining real cash positions of a device, a drawer, a store, a business and the like by facilitating the counting of currency separately from non-currency items. Furthermore, non-currency items may be divided amongst itself based on type such as store currency, lottery tickets and coupons. Organizing non-currency items in such a manner may aid in the efficiency of non-currency reconciliation and help to more precisely identify sources of errors or imbalances detected during reconciliation. A business may also more quickly determine an amount of coupons versus an amount of lottery tickets or stamps that are currently in the business or a device of the business.

Methods and systems for transaction logging and tracking for currency may also be applied to non-currency items. For example, transactions involving non-currency items may specify an employee associated with the transaction, products purchased, a device used and the like. During reconciliation, the transaction information may be used to more particularly identify the source of a problem or discrepancy in the balance if one should occur. Further information regarding reconciliation may be found in U.S. application Ser. No. 12/241,844, entitled "FACILITATING CURRENCY RECYCLER RECONCILIATION," and filed on Sep. 30, 2008, the content of which is incorporated herein by reference in its entirety.

The aspects described herein may be applied to various types of non-currency items and may be used at various locations in a product chain. For example, a customer may be able to deposit rebate requests into an ATM for immediate recognition by the financial institution. The financial institution may transmit electronic information associated with the rebate request to a sponsoring organization and receive a confirmation that the rebate will be fulfilled.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

We claim:

1. A method comprising:
   receiving, by a cash handling device located at a retail business, a non-currency item designated as payment to the retail business;
   determining, by the cash handling device, a value of the non-currency item and identification information associated with the non-currency item;
   requesting, by the cash handling device without physically transmitting the non-currency item to the sponsor, a first electronic confirmation from a sponsor of the non-currency item that the sponsor will make payment on the non-currency item;
   in response to the request, receiving the first electronic confirmation from the sponsor;
   transmitting, by the cash handling device, the identification information and the first electronic confirmation to a system of a financial institution requesting recognition of the value of the non-currency item, wherein the system is located remotely from the retail business and wherein the financial institution is different from the retail business; and
   in response to transmitting the identification information and the first electronic confirmation to the financial institution, receiving, by the cash handling device, a second electronic confirmation from the financial institution that the value of the non-currency item has been deposited to a financial account held by the business at the financial institution.

2. The method of claim 1, wherein the non-currency item is a coupon.

3. The method of claim 1, wherein the non-currency item is a lottery ticket.

4. The method of claim 1, wherein the identification information includes information specifying a sponsor of the non-currency item, wherein the sponsor is different from the financial institution and the business.

5. The method of claim 4, wherein requesting the first electronic confirmation from the sponsor includes using the information specifying the sponsor of the non-currency item.

6. The method of claim 1, wherein the identification information includes identification of a product purchased using the non-currency item.

7. The method of claim 1, wherein the confirmation that the value of the non-currency item has been deposited is received without physically transmitting the non-currency item to either a sponsor of the non-currency item or the financial institution.

8. One or more non-transitory computer readable media storing instructions that, when executed, cause a currency handling device to:
   receive a non-currency item designated as payment to a retail business;
   determine a value of the non-currency item and identification information associated with the non-currency item;
   request a first electronic confirmation from a sponsor of the non-currency item without physically transmitting the non-currency item to the sponsor;
   in response to the request, receive the first electronic confirmation from the sponsor, wherein the first electronic confirmation indicates that the sponsor will make payment on the non-currency item;
   transmit, by the currency handling device, the identification information and the first electronic confirmation to a system of a financial institution requesting recognition of the value of the non-currency item, wherein the system is located remotely from the retail business and wherein the financial institution is different from the retail business; and in response to transmitting the identification information to the financial institution, receiving, by the cash handling device, a second electronic confirmation from the financial institution that the value of the non-currency item has been deposited to a financial account held by the retail business at the financial institution.

9. The one or more computer readable media of claim 8, wherein the identification information includes information specifying a sponsor of the non-currency item, wherein the sponsor is different from the financial institution and the business.

10. The one or more computer readable media of claim 9, wherein requesting the first electronic confirmation from the sponsor includes using the information specifying the sponsor of the non-currency item.

11. The one or more computer readable media of claim 8, wherein the confirmation that the value of the non-currency item has been deposited is received without physically transmitting the non-currency item to either a sponsor of the non-currency item or the financial institution.

12. A method comprising:

receiving, by a cash handling device located at a retail business, a non-currency item designated as payment to the retail business;

determining, by the cash handling device, a value of the non-currency item and identification information associated with the non-currency item;

transmitting the identification information to a system of a financial institution requesting recognition of the value of the non-currency item, wherein the system is located remotely from the retail business and wherein the financial institution is different from the retail business;

requesting, by the cash handling device, an electronic confirmation from a sponsor of the non-currency item that the sponsor will make payment on the non-currency item without physically transmitting the non-currency item to the sponsor;

in response to the request, receiving the electronic confirmation from the sponsor; and electronically transmitting, by the cash handling device, the confirmation from the sponsor to the financial institution.

\* \* \* \* \*